United States Patent [19]

Sanders et al.

[11] 4,052,116

[45] Oct. 4, 1977

[54] SWIVEL CONNECTOR FOR AN ARC GOUGING TORCH

[75] Inventors: Harold D. Sanders; Thomas C. Landreth, both of Houston, Tex.

[73] Assignee: Central Welding Supply Co., Inc., South Houston, Tex.

[21] Appl. No.: 736,075

[22] Filed: Oct. 27, 1976

[51] Int. Cl.² .................................... H01R 39/00
[52] U.S. Cl. .................................. 339/8 R; 339/89 R
[58] Field of Search .............. 339/8 R, 8 A, 76, 9 R, 339/9 A, 9 E, 9 RY, 89 R, 89 C

[56] References Cited

U.S. PATENT DOCUMENTS

| 3,234,317 | 2/1966 | Henderson | 219/75 X |
| 3,402,381 | 9/1968 | Gaw et al. | 339/89 R X |
| 3,573,419 | 4/1971 | Henderson | 219/70 |

Primary Examiner—Gerald A. Dost
Assistant Examiner—DeWalden W. Jones
Attorney, Agent, or Firm—George M. Medwick

[57] ABSTRACT

A swivel connector is characterized by an elongated shaft member having an axis extending therethrough and a collar fixed thereon. A moveable sleeve is mounted on the shaft member and is axially moveable from a first to a second axial position relative to the shaft. In the first axial position, the sleeve is rotatable relative to the shaft member. In the second axial position, the sleeve is engaged with the fixed collar and non-rotatable relative to the shaft member.

13 Claims, 4 Drawing Figures

SWIVEL CONNECTOR FOR AN ARC GOUGING TORCH

BACKGROUND OF THE INVENTION

1. Field of the Invention

This invention relates to swivel connectors, and, more particularly, to a swivel connector adapted for use in an arc gouging torch.

2. Description of the Prior Art

The basic air-carbon arc cutting and gouging torch is well-known in the materials cutting art. The torch utilizes a solid rod of electrode material, such as carbon, gripped by a clamp element and connected to a source of electrical power. A portion of the length of the electrode is exposed and projects from the clamp toward a workpiece so that an arc may be struck and maintained between the tip of the electrode and the workpiece to form a pool of molten material beneath the arc as the arc cuts through the workpiece. Jets of pressurized gas, commonly air, are directed substantially parallel to the axis of the consumable electrode and literally gouge out the molten pool of metal formed by the arc struck between the electrode and the workpiece.

Commonly, the torch includes a connector element adapted to permit limited rotational movement of the torch handle with respect to a concentric gas and electrical conductor supply cable which is connected to the end of the handle opposite the electrode. It is through the concentric supply cable that electrical energy is supplied to the electrode and through the pressurized gas is carried to the cutting head.

An example of a prior arc cutting and gouging torch is U.S. Pat. No. 3,573,419 (Henderson). In this patent, an elongated terminal is provided through which the gas and electrical supply cable is connected into the torch handle. The torch handle is, however, permitted only limited rotational movement relative to an axis extending through the supply cable and totally restrained from axial movement relative thereto. Thus, it is often difficult to freely operate the cutting torch to most efficiently and expeditiously perform gouging and cutting operations.

In U.S. Pat. No. 3,234,317 (Henderson), a swivel coupling for a combined gas and electrical supply cable is disclosed which provides an inner, hollow, elongated member in electrical connection with an electrical conductor and in fluid communication with the interior of a pressurized gas line. The opposite end of the coupling is secured to the torch handle. The elongated inner member and the handle attached thereto are rotatable with respect to the supply cable for an angular rotational distance of less than 30° due to the provision of engaging stop members. Further, the inner member is restrained from axial relative to the supply cable.

It is therefore advantageous to provide a swivel connector for an arc gouging torch having a sleeve member axially moveable relative to a shaft member so that in a first axial position, the sleeve is freely rotatable angularly relative to the shaft member, and in a second position, the sleeve restrained from rotational movement relative to the shaft member. It is of further advantage to operatively couple a torch handle to the sleeve member of the swivel connector and a concentric gas and electrical conductor supply cable to the shaft member of the swivel connector so that when the sleeve is in the first axial position relative to the shaft member, the torch handle is freely rotatable relative to the concentric gas and electrical supply cable. Further, it is advantageous to provide a cutting torch handle so that when the sleeve is in the second axial position relative to the inner member, the torch handle is non-rotatable relative to and, when in that axial position, arranged to be disconnectable from, the concentric gas and electrical conductor supply cable.

SUMMARY OF THE INVENTION

This invention relates to a swivel connector comprising an elongated shaft member having a hollow axial passage extending therethrough. A collar having an opening therein is fixedly attached to the shaft. A sleeve is mounted on the shaft and is moveable axially thereon from a first to a second position. In the first axial position, the sleeve is freely rotatable relative to the shaft axis. While in the second axial position, the sleeve is engaged by and received within the opening in the collar and therefore non-rotatable relative to the shaft. The sleeve may be threadably or otherwise connectable to a gouging torch handle while the shaft member is attachable to a concentric gas and electrical connector supply cable. With the connections made to the swivel connector, while the sleeve is in the first axial position relative to the shaft member, the torch handle is freely rotatable throughout at least 360° of angular movement relative to the axis of the shaft member to permit efficient and expeditious handling of the gouging torch. While the sleeve is in the second axial position and engaged with the collar affixed securely to the shaft, the sleeve and the torch handle attached thereto are rotatably fixed relative to the shaft member and the associated concentric air and electrical conductor supply cable and the torch handle is thus disconnectable from the associated concentric gas and electrical conductor supply cable.

BRIEF DESCRIPTION OF THE DRAWINGS

The invention will be more fully understood from a following detailed description of a preferred embodiment thereof, taken in connection with the accompanying drawings in which.

DESCRIPTION OF THE PREFERRED EMBODIMENT

Figure 1:
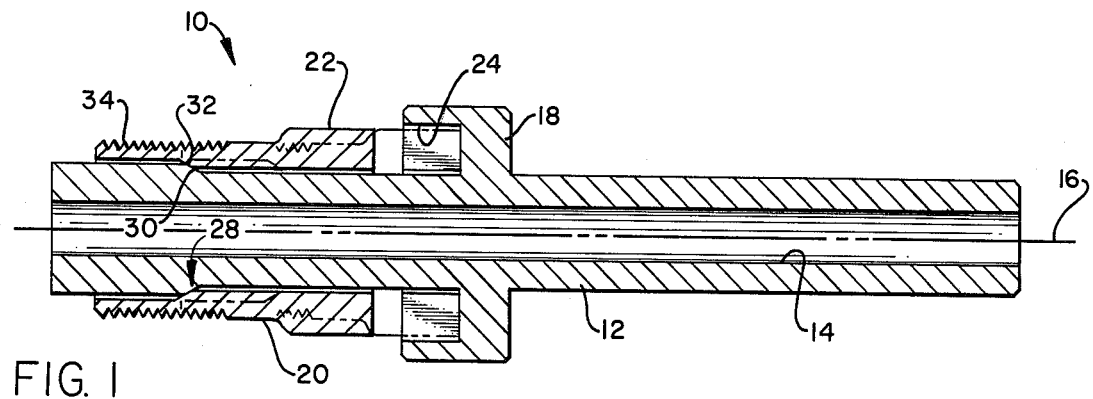
FIG. 1 is an elevational view, entirely in section, of a swivel connector embodying the teachings of this invention.

Throughout the following description, similar reference numerals refer to similar elements in all figures of the drawings.

Referring first to FIG. 1, an elevational view, entirely in section, of a swivel connector, generally indicated by reference number 10, embodying the teachings of this invention is illustrated. The connector 10 includes an axially elongated shaft portion 12 having a channel or passage 14 extending substantially axially therethrough. An axis 16 is defined through the shaft 12. A collar portion 18 is fixedly attached to the shaft 12. In FIG. 1, the collar 18 is shown as integrally disposed relative to the shaft 12, although it is apparent to those skilled in the art that other configurations may be utilized.

A sleeve 20 is mounted on the shaft 12 and is axially moveable relative to the shaft 12 from a first axial position, indicated in solid lines in FIG. 1, to a second axial position, indicated by dot-dash lines in FIG. 1. In the first axial position, the sleeve 20 is freely rotatable about the surface of the shaft 12 in either clockwise or counter-clockwise direction relative to the axis 16. The sleeve 20 has suitable means for engaging the collar 18 whereby rotational movement of the sleeve 20 relative to the axis 16 is prohibited, such as a key 22, provided at an axial end thereof, which is sized to engage a locking opening, or keyway, 24 provided within an axial end of the collar 18. The key 22 is received within the locking opening, or keyway, 24 within the collar 18 when the sleeve 20 occupies the second axial position with respect to the axis. 16. In the second axial position, due to engagement of the key 22 on the sleeve 20 with the collar 18 on the shaft 12, the sleeve 20 is restrained from free rotational movement relative to the shaft 12.

It is, of course, within the contemplation of this invention that other suitable means may be utilized whereby the sleeve 20 is engaged by the collar 18 so that rotational movement of the sleeve 20 with respect to the shaft 12 is prohibited. For example, it is noted that the means on the sleeve 20 may be of a radially greater dimension than the radial dimension of the collar 18 and may further have provided therein an opening so that movement of the sleeve to the second axial position radially encompasses the collar 18 to thereby rotational movement of the sleeve relative to the axis 16 of the shaft 12. Alternatively, it is within the comtemplation of this invention that the sleeve 20 or the collar 18 be provided with an axially extending pin which is received into the other of the members 18 or 20 so that rotational movement of the sleeve with respect to the collar is prohibited. By whatever configuration utilized, it is within the contemplation of this invention that when the sleeve 20 is in the second axial position relative to the shaft 2 and engaged by the collar 18, rotational movement of the sleeve 20 with respect to the shaft 12 is prohibited.

Means, generally indicated by reference numeral 28, is provided for limiting axial movement of the sleeve 20 with respect to the shaft 12 and maintain that axial movement within predetermined axial limitations. As shown in FIG. 1, the means 28 generally comprises a radially outwardly extending section or shoulder, 30 on the exterior surface of the shaft 12 adjacent a first axial end thereof and a radially inwardly projection, or shoulder, 2 disposed on the interior surface of the sleeve 20. It is apparent to those skilled in the art that when the sleeve 20 occupies the first axial position the shoulders 30 and 32 are in abutting contact such that further axial movement of the sleeve 20 relative to the axis 16 of the shaft 12 away from the collar 18 is effectively prohibited. Of course, other suitable expedients known in the art to prevent axial movement of the sleeve 20 with respect to the shaft 12 are within the contemplation of this invention. Also provided on the sleeve 20 are means, such as threads 34, for attaching a member to the sleeve.

Figure 2:
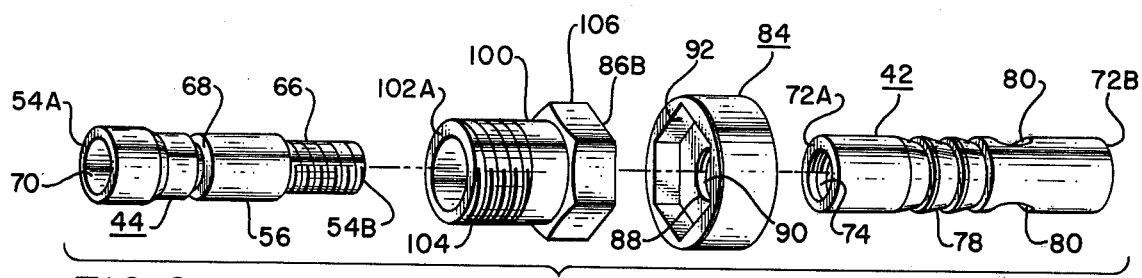
FIG. 2 is an exploded view of an embodiment of a swivel connector according to the teachings of this invention.
Figure 3:
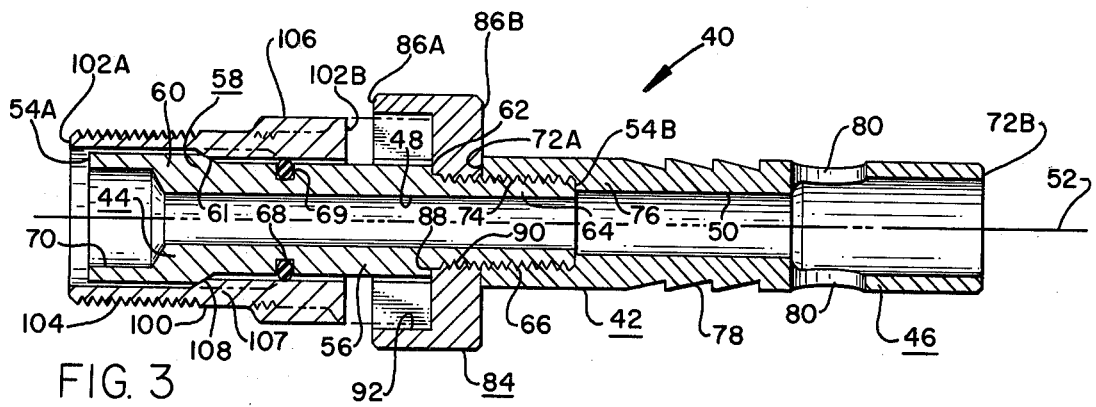
FIG. 3 is an elevational view, entirely in section, of the embodiment of the swivel connector shown in FIG. 2 according to the teachings of this invention; and, FIG. 4 is a sectional view of an arc cutting and gouging torch utilizing a swivel connector embodying the teachings of this invention.

Referring now to FIGS. 2 and 3, respectively shown are an exploded perspective view and a sectional view of a swivel connector 40 embodying the teachings of this invention. The connector shown in FIGS. 2 and 3 embodies the general principles described in connection with the swivel connector FIG. 1 but presents an apparatus having certain advantages from manufacturing standpoint.

In FIGS. 2 and 3, the shaft 42 is comprised of axially conjoined first and second axial members 44 and 46, respectively. The members 44 and 46 each have an axially extending bore 48 and 50, respectively, which register to define an axially extending through-passage within the shaft 42 through which extends an axis 52 of the swivel connector 40. Both axial portions 44 and 46 are fabricated of an electrically conductive material.

The first axial member 44 is an elongated member having first axial end 54A and a second axial end 54B thereon. The central portion 56 of the first axial member 44 is substantially cylindrical and exhibits a predetermined diameter relative to the axis 52 extending through the shaft 42. A first transition region 58 is provided adjacent the first axial end 54 A of the member 44 to connect the central portion 56 with a radially distended end portion 60 and to define a radially outwardly extended shoulder 61 between the two last-mentioned portions of the first axial member 44. The central portion 56 of the first axial member 44 is connected through a second, step transition, region 62 to a radially narrower portion 64 adjacent the second end 54B thereof, on which is provided an axially extending plurality of screw threads 66. The central portion 56 is provided with a circumferentially extending groove 68 which receives an O-ring 69. Th bore 48 through the first axial portion 44 includes a radially outwardly flared section 70.

The second axial member 46 comprises an elongated member having a first axial end 72A and a second axial end 72B. Internal screw threads 74 are provided within the member 46 adjacent the first axial end 72A thereof. The screw threads 74 cooperate and engage a portion of the screw threads 66 to threadedly secure the first member 44 with the second member 46 to define the elongated shaft 42. The threads 66 and 74 are engaged until the axial end 54B of the first axial member 44 engages a shoulder 76 provided on the interior of the member 46 adjacent the first end 72 A thereof. The second member 46 has a plurality of corrugations 78 provided on the exterior surface thereof and radially disposed openings 80 axially intermediate the corrugations 78 and the second end 72B, both for purposes which will become clearer herein, The collar member 84 comprises a substantially circular member having a first axial end 86A and a second end 86B thereon. A central axial opening 88 with threads 90 thereon engages the remaining portion of the threads 66 on the first axial member 44 to secure the collar 84 relatively fixedly in position on the shaft 42 (comprising the conjoined elements 44 and 46). The collar 84 has an axially extending locking opening, or keyway, 92 therein, the locking opening 92, in the embodiment of FIG. 3, conveniently assuming a hexagonal shape when viewed from the first axial end 54 A or the first axial member 44.

The sleeve 100 comprises an axially extending member having a first end 102A and a second end 102B thereon. The sleeve may be fabricated of an electrically conductive material. A plurality of screw threads 104 provided on the external surface of the sleeve 100 adjacent the first axial end 102A thereof define means for engaging a member (such as a cutting torch handle) with the exterior of the sleeve 100. Means for engaging the sleeve 100 to the collar 84, such as a key 106 having a hexagonal cross section (as viewed from the first axial end 54A of the member 44) sized to correspond to the hexagonal opening 92 in the collar 84, is disposed on the sleeve 100 adjacent the second end 102B thereof. The hexagonal key portion 106 is receivable within the hexagonal opening 92 disposed within the collar 84. Of course, other complimentary key and opening arrangements may be equally efficacious for the purpose of engagement of the sleeve 100 and the collar 84, and are within the contemplation of this invention. The sleeve 100 has a radially inwardly extending transistion region 107 adjacent the interior surface thereof defining a radially inwardly extending shoulder 108 thereon.

The sleeve 100 is axially movable from a first to a second axial position relative to the first portion 44 of the shaft 42 with the abutment of the shoulder 61 (on the exterior surface of the first portion 44) and the shoulder 108 (on the interior surface of the sleeve 100) cooperating to define means for limiting the axial movement of the sleeve 100 relative to the shaft 42. In the first axial position, illustrated in solid lines in FIG. 3, the sleeve 100 is freely rotatable relative to the first portion 44 of the shaft 42. Also, while in the first axial position, the shoulders 61 and 108 are in abutting contact. When in the second position, illustrated in dot-dash lines in FIG. 3, the key 106 on the second axial end 102B of the sleeve 100 is received within securely engaged by the opening 9 provided within the collar 84, thus breaking the abutting contact between the shoulders 61 and 108. Together, the opening 92 and the key 106 provide means for prohibiting the rotational movement of the sleeve 100 with respect to the shaft 42 (and more particularly, the first axial portion 44 thereof) when the sleeve 100 is in the second axial position relative to the sleeve 42.

It is apparent that when disassembled (as in the exploded view of FIG. 2) into its four constituent elements described hereinabove, the connector 40 is assembled by first inserting the sleeve 100 over the first axial portion 44 at the second end 46B thereof. The collar 84 is then threaded by engagement of screw threads 90 (on the collar 84) and threads 66 (on the first axial member 44). The first and second axial portions 44 and 46 are then threaded through the engagement of threads 66 and 74 to define the elongated shaft and to provide a swivel connector 40 embodying the teachings of this invention.

Figure 4:
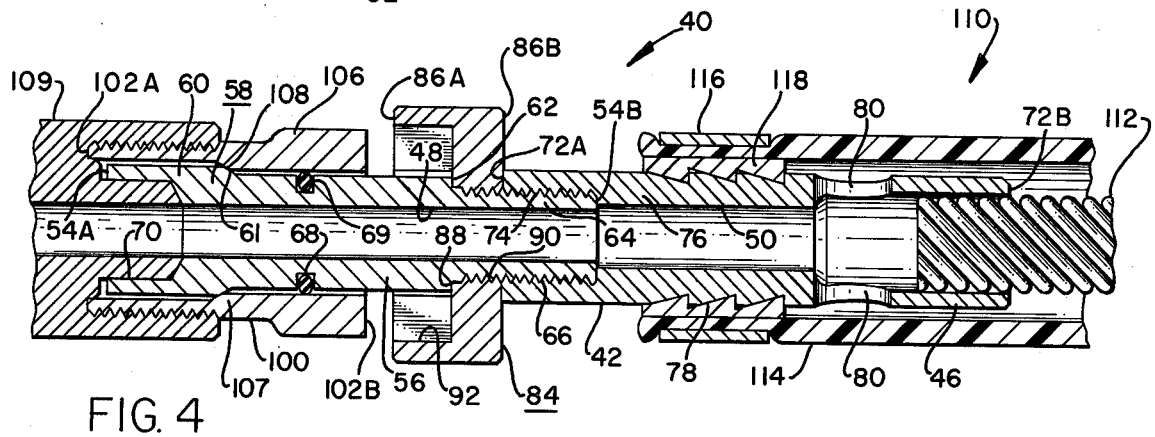

Referring now to FIG. 4, an elevational view entirely in section of an arc gouging torch utilizing a swivel connector embodying the teachings of this invention is shown. The swivel connector itself is substantially similar to that shown in FIGS. 2 and 3, with the further addition of an arc gouging torch handle 109 being threadedly secured to the threads 104 adjacent the first axial end 102A of the sleeve 100. The torch handle may be any typical torch handle which includes both electrical and pressurized gas connections to the cutting electrode. A concentric gas and electrical conductor cable 110 is affixed to the second axial portion 46 of the shaft 42. The cable 110 includes an electrical conductor 112 surrounded by a concentric pressurized gas hose 114, as is known to those skilled in the art. The electrical conductor 112 is securely mounted within the end 72B of the second member 46 by suitable means, such as swagging. The concentric pressurized gas hose 114 is banded about the exterior of the second axial portion 46 adjacent the corrugations 78 thereon, as by a hose clamp 116. It may be advantageous in some situations to provide a corrugated sleeve 118 intermediate the interior diameter of the hose 114 and the corrugations 78 on the exterior of the second axial portion 46 to further insure connection between the pressurized gas hose 114 and the second axial portion 46 of the shaft 42. The second end of the concentric gas and electrical cable 110 may be connected to the appropriate sources of pressurized gas and electrical energy in a manner known to those skilled in the art.

It is apparent to those skilled in the art that suitable electrical connections are provided to the arc electrode by the conduction of electrical current through the conjoined axial portions 44 and 46 of the shaft 42 and the electrically conductive sleeve 100. As noted above, when the sleeve 100 is in the first position relative to the shaft 42, the sleeve 100 (and thus the torch handle and associated apparatus appertinent thereto) are freely rotatable relative to the shaft 42 (and the cable 110 connected thereto) and abutting contact is generated between the shoulders 61 and 108. When the sleeve is in the second position relative to the shaft 42, the sleeve 100 is engaged by collar 84 to prevent free rotation thereof, and the abutting contact between the shoulders 61 and 108 is broken. The O-ring 69, disposed within the groove 68, substantially electrically isolates the sleeve 100 from the axial portion 44 of the shaft 42 when the sleeve 100 occupies the second axial position.

A suitable pressurized gas connection for the passage of pressurized gas to the gouging torch handle 109 (and the cutting electrode thereon) is also provided. Gas from the source passes through the annular region on the interior of the gas hose 114 and the exterior of the electrical conductor 112, through radial passages 80 provided in the second axial portion 46 of the shaft 42, and through the registering bores 48 and 50 extending through the shaft portion 42 and into the handle 109 of the arc gouging apparatus. The O-ring 69 (in the groove 68) prevents flow of pressurized gas from the interior passages, along the exterior of the first axial portion 44 and the interior of the sleeve 100, both when the sleeve is in the first as well as the second axial position.

It is apparent to those skilled in the art that when the sleeve 100 occupies the first position relative to the axis of the shaft 42, the torch handle 109 attached thereto is in full electrical contact with the electrical source (through the electrical connection provided between the abutting contact of the shoulders 61 and 108). Further, a supply of pressurized gas is maintained to the torch 109 from the gas source, through the annular region and radial passages 82 and the registered passages 48 and 50. When in first axial position, the torch handle 109 is freely rotatable about the axis 52 of the shaft 42 to permit efficient and expeditious handling thereof. Thus, when in the first axial position, rotation of the handle 109 with respect to the sleeve 100 in order to disconnect the threaded engagement 104 therebetween is ineffectual since the sleeve 100 is rotatable relative to the shaft 42. When it is desired to remove the handle 109 from the swivel connector and, therefore, disconnect the torch from the source of electricity and gas, it is merely necessary to cause axial displacement of the sleeve 100 from the first to the second axial position with respect to the shaft 42. Once in the second axial position with the shaft 100 engaged within the collar 84, rotation of the sleeve 100 with respect to the shaft 42 is precluded. Therefore, disconnection of the threaded engagement between the handle 109 and the sleeve 100 at the threads 104 may be done efficiently and expeditiously.

In summary, it is apparent that a swivel connector which permits free rotational movement of a welding torch handle with respect to its concentric gas and electrical cable is provided by a connector embodying the teachings of this invention. Further, expeditious disconnection of the welding torch handle from the supplies of electricity and gas may be effected by the movement of the sleeve with respect to the shaft from the first to the second axial position.

What is claimed is:

1. A swivel connector comprising:
   a shaft having an axis therethrough;
   a collar attached to said shaft; and
   a sleeve mounted on said shaft and moveable from a first to a second position relative to said axis, said sleeve having a first and a second axial end thereon;
   said collar having a first and a second axial end thereon, said second axial end of said sleeve being adjacent to said first axial end of said collar;
   said sleeve in said first axial position being rotatable relative to said shaft, said sleeve in said second axial position being engaged with said collar and non-rotatable relative to said shaft;
   said collar having an opening provided in said first axial end, said sleeve having a key member disposed on said second axial end, said key member being sized to fit with said opening in said collar, said key being disposed within and received by said opening in said collar when said sleeve is in said second axial position.

2. The swivel connector of claim 1 further comprising means for limiting axial movement of said sleeve relative to said shaft.

3. The swivel connector of claim 2 wherein said limiting means includes a radially outwardly extending shoulder disposed on said shaft and a radially inwardly extending shoulder disposed on said sleeve, said shoulders being in abutting contact when said sleeve in said first position and being spaced axially apart when said sleeve is in said second position.

4. The swivel connector of claim 1 further comprising means disposed on said sleeve at said first axial end thereof for attaching a member to said sleeve.

5. The swivel connector of claim 1 wherein said shaft has an axially extending bore therethrough.

6. The swivel connector of claim 1 wherein said shaft comprises a first and a second threadedly engaged axial portion, and wherein said collar is threadedly secured to said first axial portion of said shaft.

7. The swivel connector of claim 6 wherein said sleeve is axially moveable relative said first axial portion of said shaft.

8. A swivel connector comprising:
   a shaft having an axial bore extending therethrough, said shaft including first and second threadedly engaged axial portions;
   a collar having a first and a second axial end thereon, said collar being threadedly secured to said first axial portion of said shaft, said collar having an opening provided in said first axial end thereof;
   a sleeve mounted on and axially movable from a first to a second axial position relative to said first axial portion of said shaft, said sleeve having a first and a second axial end thereon, said second axial end of said sleeve being adjacent to said first axial end of said collar, said sleeve having a key member on said second axial end thereof sized to engage said opening in said collar;
   said sleeve in said first axial position being rotatable relative to said first axial portion of said shaft, said key on said sleeve being received by said opening in said collar when said sleeve is in said second axial position whereby said sleeve is non-rotatable relative to said first axial portion of said shaft.

9. The swivel connector of claim 8, further comprising means for limiting axial movement of said sleeve relative to said first axial portion of said shaft.

10. The swivel connector of claim 9, wherein said limiting means includes a radially outwardly extending shoulder disposed on said first axial portion of said shaft and a radially inwardly extending shoulder disposed on said sleeve, said shoulders being in abutting contact when said sleeve is in said first axial position and being spaced axially apart when said sleeve is in said second axial position.

11. The swivel connector of claim 9, further comprising means disposed on said sleeve at said first axial end thereof for attaching a member to said sleeve.

12. The swivel connector of claim 8, wherein said second axial portion of said shaft has a radial opening extending therethrough and communicating with said bore.

13. The swivel connector of claim 8, wherein said key and said opening each have a hexagonal shape.

* * * * *